United States Patent [19]

Kleeberg et al.

[11] 3,936,523
[45] Feb. 3, 1976

[54] METHOD FOR THE MANUFACTURE OF ELONGATED MATERIAL PARTICULARLY ELECTRIC CABLE AND WIRE

[75] Inventors: Wolfgang Kleeberg, Erlangen; Rudolf Wiedenmann, Nurnberg; Helmut Ahne, Rottenbach, all of Germany

[73] Assignee: Siemens Aktiengesellschaft, Munich, Germany

[22] Filed: Feb. 20, 1974

[21] Appl. No.: 444,100

[30] Foreign Application Priority Data

Feb. 21, 1973 Germany............................ 2308637

[52] U.S. Cl....... 264/211; 260/94.9 GA; 260/249.5; 264/174; 264/236
[51] Int. Cl.² .......................................... B29C 25/00
[58] Field of Search............. 260/791, 42.16, 42.38, 260/249.5, 94.9 GA, 174 GB; 264/236, 176 R, 347, 211

[56] References Cited
UNITED STATES PATENTS

| | | | |
|---|---|---|---|
| 2,953,563 | 9/1960 | Schaefer et al.................... | 260/791 |
| 2,958,672 | 11/1960 | Goldberg..................... | 260/94.9 GA |
| 3,097,193 | 7/1963 | Gruber........................ | 260/94.9 GA |
| 3,255,191 | 6/1966 | Dexter et al..................... | 260/249.5 |
| 3,828,002 | 8/1974 | Wetslinning et al............. | 260/249.5 |

*Primary Examiner*—Robert F. White
*Assistant Examiner*—Gene Auville
*Attorney, Agent, or Firm*—Kenyon & Kenyon Reilly Carr & Chapin

[57] ABSTRACT

In a method for the manufacture of formed elongated articles of cross-linked polyethylene in which the polyethylene is shaped in the non-cross-linked condition and is subsequently cross-linked by the application of heat in the presence of organic radical-forming agents, the improvement wherein 0.1 to 20% by weight of polyethylene of a cross-link promoting coagent selected from the group consisting of 2,4-dienoxy-6-amino-alkyl(ene)-s-triazines and N,N'-bis-(2,4-dienoxy-s-triazine-6)-diamines, is admixed with the polyethylene and is thereafter shaped and continuously cross-linked by application of heating at about atmospheric pressure and at a temperature above about 150°C. and below the decomposition temperature of the components of the mixture.

48 Claims, No Drawings

METHOD FOR THE MANUFACTURE OF ELONGATED MATERIAL PARTICULARLY ELECTRIC CABLE AND WIRE

DESCRIPTION OF THE INVENTION

The increasing demand for electric energy calls for efficient distribution networks. To this end, one is interested in higher load capacities of transmission lines with minimum losses and therefore, endeavors to use insulation with maximum thermal stability and minimum dielectric losses for electric cable and wire. For electric cables with plastic insulation this means that insulation with the heretofore commonly used thermoplastic material base, such as polyvinylchloride and polyethylene, must be replaced to an increasing extent by more dimensionally heatstable insulating materials, for instance, with a cross-linked polyethylene base.

Also, in other technical fields there is interest in having available dimensionally heat-stable, continuously formed plastic sections or tubing which may be used as storage containers, or transport containers. Such containers may be disposed on a carrier, such as a ship, airplane or truck for transporting hot water or hot oil and the like. Also such materials may be used for application in profiled jointing rings and cord, as well as for use in combination with metal stripping, or metal rope or wire which is coated with plastic, for instance, for corrosion protection.

It is known to manufacture electric cable having insulation made of cross-linked plastic, such as cross-linked polyethylene. Such a method comprises applying non-cross-linked polyethylene to the conductor and is reacted into a tougher and more elastic state by exposing the polyethylene to high-energy irradiation which produces interlinking or cross-linking of the polyethylene. (German Auslegeschrift 1,000,076). Such a method, however, is very expensive process-wise and is attended by high costs.

Another method has also been disclosed in the technology in which the initially thermoplastic material is cross-linked by chemical means. For this purpose, chemical cross-linking agents or catalysts or initiators such as, preferably organic peroxides, are used. They may be worked into the thermoplastic polyethylene mixture wherein they are decomposed at elevated temperature thereby causing the chemical cross-linking of the polyethylene (German Pat. No. 1,109,366). The peroxides heretofore preferably used for cross-linking of polyethylene, particularly the ditertiary alkyl or aralkyl peroxides such as, for instance, di-$\alpha$-cumyl peroxide, however, are subject to thermal decomposition, particularly in the temperature range of technical interest, and may decompose into gaseous and highly volatile peroxide reaction products. This leads to gas bubbles in the cross-linked polyethylene.

To prevent this pore formation, which is detrimental particularly for electrical purposes, it is customary to cross-link the polyethylene insulation of electric cables at high pressure, and particularly in a pressurized atmosphere of steam at pressures of about 160 to 200 N/cm$^2$ (16 to 20 atm.gauge) (German Offenlegungsschrift 1,915,892). The cross-linking temperatures attainable are a maximum of about 210°C. For this reason, and also depending on the insulating material (composition of mixture) and the wall thickness of the insulation, the residence times of the coated conductors are about 1 to several minutes if the process is carried out by means of passing the covered conductors coming from the extruder through vulcanizing tubes filled with super-heated steam. As the vulcanizing tubes cannot be made of any desired length, the running speed of the covered conductors must be adapted to required residence time. This running speed is substantially slower than the speeds which are attainable per se in extruding the conductor jackets.

It is furthermore known to perform the vulcanization of cable insulation of synthetic or natural rubber in a "pressureless" system, i.e., at or nearly at atmospheric pressure, in a salt bath (British Pat. Nos. 906,139 and 1,012,562; German Offenlegungsschrift 1,939,134). Through suitable composition of the rubber mixtures, for instance, by using sulfur cross-linking agents instead of peroxides, a bubble-free vulcanized product can be obtained.

It is an object of the invention to provide a process for the manufacture of elongated material such as formed sections or tubing with a cross-linked polyethylene base, particularly for the manufacture of electric cable and wire with a jacket and/or insulation having a cross-linked polyethylene base. The process of this invention is more economical and process-wise is a more advantageous method than the known cross-linking process described using pressurized steam. The process of this invention ensures good electrical properties, particularly good dielectric properties of the sections or the tubing, particularly of the jackets and/or the insulation. By "jackets and/or insulation" are meant here layers or sheets with a cross-linked polyethylene base provided within the cable cross section. These may be, for instance, slightly conductive conductor coatings or insulation which is applied directly on a conductor or on a conductor coated with a conductor finish (glazer), or may be cable jackets or a protective layer of a metallic cable sheath.

The method of the present invention includes extrusion of non-cross-linked polyethylene and subsequent cross-linking thereof through the application of heat in the presence of organic radical-forming agents. According to the invention, a polyethylene mixture is used for the manufacture of the section or tubing, particularly for covering and/or insulating electrical cable or wire, which contains between about 0.1 to 20% by weight of the polymer of a cross-link promoting agent. Such agents include 2,4-dienoxy-6-aminoalkyl(ene)-s-triazines and/or of N,N'-bis-(2,4-dienoxy-s-triazine-6) diamines. The polyethylene mixture is continuously cross-linked, after extrusion, by heating in a high-temperature section, for instance, in a salt bath, a liquid bath, a fluidized bed or in hot air, or in a suitably heated inert gas such as nitrogen, argon, carbon dioxide, etc. The pressure is maintained at approximately atmospheric pressure and the temperature at above about 150°C., and preferably at least about 200°C.

In the method developed in accordance with the invention, cross-linking the sections and tubing having a polyethylene base, particularly of the jacket or the insulation of an electric conductor or an electric cable takes place under normal pressure conditions, i.e., without super-atmospheric pressure. It is thereby possible to carry out the "pressureless" cross-linking at considerably higher temperatures and accordingly, with considerably higher speed. This is surprising inasmuch as it had heretofore been assumed that polyethylene cannot be cross-linked without pressure by means of organic radical-forming agents if the development of gas bubbles during the cross-linking due to the formation of gaseous dissociation products of the radical-forming agents is to be avoided. It has been discovered that the gaseous dissociation products produced during the cross-linking of polyethylene using organic radical-forming agents do not lead to the formation of bubbles in the cross-linking process, if certain cross-link promoting admixtures are added to the polyethylene.

Only through the use of such cross-link promoting additives as herein disclosed does bubble formation no longer occur at cross-linking temperatures of above 200°C. and in particular, at temperatures of above 220°C., i.e., at temperatures, which can be hardly or not at all be reached with the conventional cross-linking processes for polyethylene using pressurized steam. Such bubble formation, however, is unavoidable at cross-linking temperatures above 220°C. under prior art conditions wherein no cross-link promoting additives are admixed with the polyethylene or if only previously known cross-link promoting additives are admixed with the polyethylene. An example of such a known cross-link promoting additive is triallyl cyanurate (TAC), which is difficult to mix into or with polyethylene due to its low solubility in polyethylene and because of its low melting point (about 27°C.). This leads to evaporation losses and thereby to impairment of predetermined mixing ratios, particularly at high cross-linking temperatures (above 220°C.).

Since the cross-linking temperature available under the method herein claimed can be substantially higher than the temperature in the prior methods, the cross-linking can be performed in substantially less time and therefore, at a substantially higher production speed. Without the use of unusually long heating zones, the running speed for the cross-linking can be made to approach the extrusion velocities of the polyethylene, so that a more economical utilization of the extruder is obtained. Also, if the polyethylene mixture already contains the organic radical-forming agents necessary for cross-linking when it is extruded, the cross-linking takes place during the same extrusion operation.

There are upper limits for the cross-linking temperature with the pressureless cross-linking method disclosed within the scope of the invention. The ultimate limit is set by the decomposition temperature of the polyethylene, which is at about 400°C. Generally, cross-linking temperatures above 300°C. are of less interest, as in this temperature range (300°C. – 400°C.) the cross-linking reaction proper takes place in less than 1 second. The corresponding running times, i.e., the cross-linking times proper, of the insulated or jacketed cable or wire through the salt bath, which are increased by the time required to heat the polyethylene to the cross-linking temperature, then are no longer important in the time frame of the manufacturing process. The temperature range for the cross-linking of the polyethylene by the method according to the invention is therefore between 210°C. and 300°C. as far as the increase of the production speed is concerned, and preferably at about 230°C. and 280°C.

A further advantage of the new method, in which polyethylene contains the organic radical-forming agents required for the cross-linking and the cross-link promoting coagents is extruded and is cross-linked in the same operation without pressure, is seen in the fact that now polyethylene insulation with other than rounded cross sections, i.e., for instance, so-called sector conductors, and particularly also pre-twisted sector conductors, can be cross-linked in the same operation in the manufacture of electric cable and wire. To such conductors, thermoplastic insulation material is generally applied by the so-called "hose-stretching" process, in which the tubing which surrounds the conductor is initially made with clearance or play and then is extruded such as to cause the conductor to be pulled off at a higher velocity than the exit velocity of the tubing thereby causing the tubing to be brought into contact with the conductor on all sides by stretching. The use of this hose-stretching process with subsequent cross-linking of the thermoplastic material in a vulcanizing tube filled with saturated steam has not been feasible heretofore because premature compression of the tubing took place due to the pressure in the vulcanizing tube required for pore-free cross-linking.

The important advantage of the new method is therefore that in spite of the pressureless cross-linking of the polyethylene at cross-linking temperatures of preferably above 220°C., a pore-free and therefore high-quality electrical product, in particular, insulation or jacketing of electric cable, is obtained. The products of cross-linked polyethylene obtained with this method contain no bubbles or voids stemming from gaseous decomposition products of the peroxidic cross-linking agents used, or from other sources. Their mechanical and electrical properties are therefore at least equivalent to the products obtained with pressurized steam.

The measure of pressureless cross-linking of the polyethylene provided within the scope of the invention is essentially based on the use of certain cross-link promoting agents, i.e., the 2,4-dienoxy-6-amino-alkyl-(ene)-s-triazines and/or the N,N'-bis'(2,4-dienoxy-s-triazine-6) diamines, which are unsaturated derivatives of s-triazine. These substances are produced by partial aminolysis of trisenoxy-s-triazines with diamino alkanes, diamino alkylenes, diamino-alkylated aromatic and heterocyclic compounds, or by partial aminolysis of trisalkenoxy-s-triazines with primary aliphatic amines as well as secondary alkylene amines. The cross-link promoting agents mentioned are used in an amount of between about 0.1 and 20% by weight and preferably 0.1 to 5% by weight of the polymer.

The above-mentioned 2,4-dienoxy-6-alkyl(ene) amino-s-triazines are represented by the general formula:

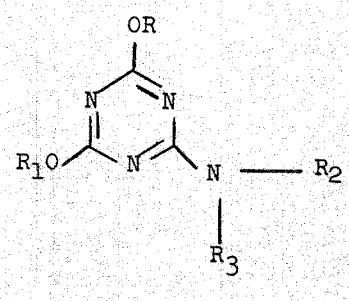

where:
R is any of an allyl, methallyl, ethallyl, propallyl, 3-ethylbutenyl-2, 3-butenyl,2,4-hexadienyl, crotyl, 3-nonenyl group;
$R_1$ is any of R;
$R_2$ is any of an alkyl group with 1 to 20 carbon atoms, an alkyl cycloalkane group with 4 to 10 carbon atoms, an alkylene aryl-(-heteroaryl) group with 7 to 10 carbon atoms, an allyl, alkene and alkyne group with 3 to 16 carbon atoms; and, $R_3$ is any of hydrogen or an alkylene group, which may be cyclically bonded to $R_2$ and wherein individual methylene groups may be substituted by oxo or thio groups.

Examples of the alkyl groups are methyl, ethyl, propyl, butyl, hexyl, stearyl groups and isomers, in which the amino group is bonded to the alkyl residue via a methylene group.

Examples of alkylene cycloalkane groups are methylene cyclopropane, ethylene cyclobutane, and ethylene cyclohexane groups. The alkylene aryl groups can be benzyl, phenethylcinnamyl groups. Alkene and alkyne groups can be, for instance, butenyl-3, hexenyl-4 and butynyl-3 or heptynyl-5 groups. An alkene group can be a trimethylene, tetramethylene group, wherein oxo or thio groups can also be included in place of methylene groups.

Examples for unsaturated alkyl(-ene amino-s-triazine esters are: 2,4-dialloxy-6-methylamino-s-triazine (R = $R_1$ = allyl, $R_2$ = methyl, $R_3$ = H); 2,4-diethalloxy-6-stearylamino-s-triazine (R = $R_1$ = ethallyl, $R_2$ = stearyl, $R_3$ = H); 2,4-dimethalloxy-6-allylamino-s-triazine (R = $R_1$ methallyl, $R_2$ = allyl, $R_3$ = H); 2,4-dialloxy-6-phenethylamino-s-triazine (R = $R_1$ = allyl, $R_2$ = phenethyl, $R_3$ = H); 2,4-dialloxy-6-pyrrolidino-s-triazine (R = $R_1$ = allyl, $R_2$ = $R_3$ = tetramethylene); 2,4-dimethalloxy-6-pyrrolino-s-triazine (R = $R_1$ = methallyl, $R_2$ = $R_3$ = 1,4-butene-(2); 2,4-dialloxy-6-morpholino-s-triazine (R = $R_1$ = allyl, $R_2$ = $R_3$ = ethylene oxoethylene); 2,4-dicrotyloxy-6-benzylamino-s-triazine (R = $R_1$ = crotyl, $R_2$ = benzyl, $R_3$ = H).

The method for preparing these unsaturated s-triazines is surprisingly simple. Trisenoxy-s-triazine and alkyl(-ene)-amine or aryl alkylamine are melted and combined. After standing for several hours, the unsaturated alkyl(-ene)aminotriazine ester precipitates mostly as a solid with a yield of about 80 to 90%.

The above-mentioned "bridged" unsaturated s-triazines, i.e., the N,N'-bis-(2,4-dienoxy-s-triazine-6)-diamines, are represented by the formula

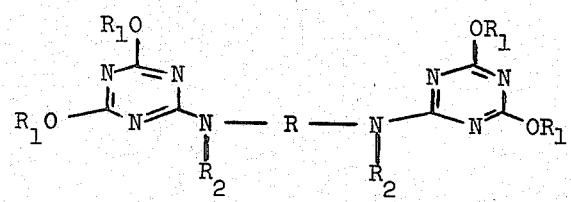

wherein:
R is any of an alkylene group with 2 to 18 carbon atoms, a bisalkylene cycloalkane group with 5 to 10 carbon atoms, or dialkene furan, -thiophene, -pyridine or triazine groups with 6 to 12 carbon atoms, and other heterocyclic structures substituted with alkylene groups;

$R_1$ is preferably allyl, but may also be crotyl, methallyl, ethallyl, propallyl, 3-butenyl, 2-hexenyl, 2,4-hexadienyl-3-decenyl and other unsaturated groups, and;

$R_2$ is any of H or an alkylene group, which together with R forms a diazacycloaliphatic ring.

Examples of alkylene groups are: ethylene; 2-methylpropylene-1,3; 2,3-dimethylbutylene-1,4; trimethylene; tetramethylene; pentamethylene; hexamethylene; heptamethylene; and octamethylene groups as well as homologs with methyl, ethyl and isopropyl groups in the side chain and 2-methylamino groups in $\omega,\omega'$ position.

Examples of bisalkylene-cycloalkane groups are: bismethylene-cyclopropane; bismethylene or bisethylene-cyclobutane; and, bismethylene or bisethylene-cyclohexane.

Bisalkylenearylene groups are, for instance: bismethylene or bisethylene-phenylene, -tolylene and -naphthylene groups. Examples of dialkylenefurane, -thiophene, -pyridine and -triazine groups are diethylenefurane, -thiophene, -pyridine and -triazine groups.

Several examples of these N,N'-bis-(2,4-dienoxy-s-triazine-6)-diamines are given in the following: N,N'-bis-(2,4-dialloxy-s-triazine-6)diamino ethane (R = ethylene, $R_1$ = allyl, $R_2$ = H); N,N'-bis-(2,4-dialloxy-s-triazine-6)-diamino butane (R = tetramethylene, $R_1$ = allyl, $R_2$ = H); N,N'-bis-(2,4-dimethalloxy-s-triazine-6)-diamino hexane (R = hexamethylene, $R_1$ = methallyl, $R_2$ = H); N, N'-bis-(2,3-diethalloxy-s-triazine-6)-diamino octane (R = octamethylene, $R_1$ = ethallyl, $R_2$ = H); N,N'-bis-(2,4-dialloxy-s-triazine-6)-diaminodiethylene-2,4-s-triazine (R = 2,4-diethylene-s-triazine, $R_1$ = allyl, $R_2$ = H); N,N'-bis-(2,4-dialloxy-s-triazine-6)-diaminodiethylene pyridine (R = diethylene pyridine, $R_1$ = allyl, $R_2$ = H); N,N'-bis-(2,4-dialloxy-s-triazine-6)-piperazine (R = ethylene, $R_1$ = allyl, $R_2$ = methylene).

The method of preparation of these agents is straightforward. Generally, the pure starting materials are combined in equimolar ratio at room temperature and permitted to stand for several hours, preferably at between 20°C. and 50°C. A solvent can usually be dispensed with and heating or cooling operations are usually no more necessary than for post-purification recrystallization, as the reaction products are usually analytically pure and are produced with a yield of about 80 to 98% as solids.

With the method according to this invention, commercial polyethylenes, which are produced either by the high-pressure or the low-pressure process, can be used as well as mixtures of high- and low-pressure polyethylenes in any mixing ratio. Also, peroxidic cross-linkable copolymers of ethylene may be included. It is advantageous, particularly for electric cables in the range of medium and high voltages, to use polyethylenes which are free from components which are not soluble in polyethylenes such as catalyst residues and polymerisation agents, and also free of dust and gel components as well as of moisture. On the other hand, it is possible in the case of low-voltage cables to work with polyethylene mixtures which are provided with fillers, pigments, etc.

As radical-forming agents, which bring about the di-tertiary cross-linking, are preferably used: di-tertiary alkyl or aralkyl peroxides such as diItertiary butyl peroxide; dicumyl peroxide; 1,3 bis(t-butylperoxyisopropyl)-benzene; 2,5 dimethyl-2,5 di(t-butylperoxy)-hexane; and 2,5 dimethyl di(t-butylperoxy)-hexane in amounts of 0.1 to 5% by weight of polymer.

Common mixing methods can be used for mixing the polyethylene with the peroxidic cross-linking agents and the cross-link promoting agents as well as with stabilizers against thermal-oxidative decomposition and, optionally, with additives of coloring pigments. However, it is advisable to homogenize this mixture, by heating it above the softening point of the polymer and by a suitable kneading process. However, care must be taken that no linking of the peroxide-containing mixture takes place. Instead, the polymer alone can also be heated above the softening point, and then, the additives such as cross-linking agents, cross-link-promoting agents, coloring pigments and aging retardants can be added to the melted polymer in order to obtain uniform distribution; it is advisable to add the cross-linking agent last.

However, in order to achieve good and uniform distribution of the peroxide and the cross-link-promoting coagent which is to be used according to the invention, or of the mixture of such cross-link-promoting coagents, whereby bubble-free, pressureless cross-linking is promoted, it is advantageous to add the peroxide to the granular or powdered polyethylene in a suitable solvent such as acetone, dichloromethane, benzene or alcohol, prior to processing of the cross-linkable polyethylene compound in the extruder. To aid the distribution, the mixture can be homogenized by heating it above the softening point of the polyethylene. The peroxide dissolved in a solvent and, if required, the cross-link-promoting coagent can also be added directly to the melted polyethylene. In the course of admixing the cross-linking agent and the cross-link-promoting coagent, other additives such as oxidation stabilizers, stabilizers against copper catalysis decomposition of polyethylene or color pigments can be mixed in.

Particularly advantageous is the use of a lubricant such as, for instance, silicone oil or a lubricant which serves at the same time as a solvent for the peroxide and possible for the coagent and which is added to the polyethylene which is present in granular or powder form. For this purpose, solvents such as, for instance, diphenyl ether and chlorinated biphenyl can be used. They are non-volatile in the range of the processing temperature of the polyethylene and have no detrimental effect on the cross-linking of the polyethylene.

The cross-linkable polyethylene mixture prepared by one of the methods described above is applied to the conductor, which has been made free of dust, wire drawing oil and oxidation products which might adhere to the surface. The polyethylene is applied by extruding and is subsequently cross-linked in a liquid bath continuously and without pressure at temperatures above 150°C. and preferably 200°C. to 280°C. As the heat exchange medium in the liquid bath, there can be used, for instance, polyethylene glycols, but preferably are eutectic salt mixtures. Because it can be washed off easily with water, a heat exchange medium consisting of a eutectic salt mixture of 53% $KNO_3$, 40% $NaNO_2$ and 7% $NaNO_3$ has proven particularly useful.

It is advisable to preheat the metallic surface, e.g., the conductor, to temperatures of between about 80°C. to 200°C., and preferably 100°C. to 170°C., by means of a suitable preheating arrangement before the cross-linkable polyethylene compound is applied which are known in the art.

In the following, the invention will be illustrated by means of several examples.

EXAMPLE 1

A copper conductor cleaned of dust and wire drawing oil, built up of several wires and having a cross sectional area of 1.5 mm²2, was preheated to 120°C. and was continuously sprayed on all sides with a mixture of 96.5 parts of high-pressure polyethylene ($d = 0.918$, fusion index $MFI_{190/2} = 0.2$), 1.2 parts of 1,3-bis-(t-butylperoxyisopropyl)benzene (96%), 2.0 parts of 2,4-dialloxy-6-stearylamino-s-triazine and 0.3 parts of polymer 2,2,4-trimethyl-1,2-dihydroquinoline.

For the preparation of the mixture, the polyethylene, which was in granular form, was reacted with a solution of the peroxide, the 2,4-dialloxy-6-stearylamino-s-triazine and the aging retardant in dichloromethane. The mixture was allowed to stand for several days and the solvent was then evaporated. The mixture was homogenized through a mixing extruder at 120°C. and then granulated.

The insulation coating obtained by application of the mixture at a temperature of 126°C. to 131°C. (wall thickness of the insulation 0.8 mm) was then continuously cross-linked in a salt bath at atmospheric pressure following application of the mixture. The bath which consisted of a eutectic nitrite-nitrate mixture was used. The following salt bath temperatures and dwelling times in the salt bath were used:

TABLE 1

| Salt Bath Temperature (°C.) | Dwelling Time in the Salt Bath / Cross-Linking Time (Sec.) | Percent Cross-Linking (%) |
|---|---|---|
| 200 | 32 | 81 |
| 220 | 12 | 80 |
| 240 | 7 | 83 |
| 250 | 5 | 81 |

After stepwise cooling (80°C., 60°C., 20°C. water temperature), bubble-free insulation of cross-linked polyethylene was obtained which, although adhering tightly to the copper conductor, was easily stripped therefrom.

The cross-linking percentages, determined as a measure for the degree of cross-linking of the cross-linked polyethylene insulation, are shown in Table 1. By suitable measurements of the mechanical properties of such pressureless, cross-linked insulation of cross-linked polyethylene it was possible to ascertain that at a percentage of 76% and higher of cross-linking, the insulation is cross-linked to a technically sufficient degree, i.e., the insulation manufactured according to Table 1 is sufficiently cross-linked for use as described.

The percentage of cross-linking is determined as follows:

About 0.5 g. of the cross-linked insulation in the form of test specimens having approximately 1 mm diameter are extracted in stabilized xylol for 6 hours and are then dried in vacuum at 100°C. for 12 hours.

$$\text{Percent cross-linking} = \frac{\text{Weight of extracted, dried specimen}}{\text{Weight of original specimen}} \times 100.$$

EXAMPLE 2

As per Example 1, insulation was produced at the cross-linking temperatures and times given there, according to Table 1, from a mixture which contained triallylcyanurate instead of 2,4-dialloxy-6-stearylamino-s-triazine.

In contrast to Example 1, the pressureless, cross-linked insulation obtained with this mixture contained bubbles, particularly at the boundary surface between the copper conductor and the insulation. Samples taken from different points of the insulation, moreover, showed differences in the degree of cross-linking.

EXAMPLE 3

As per Example 1, a mixture was prepared which contained instead of 2,4-dialloxy-6-stearylamino-s-triazine, 2 parts of a coagent, which had been obtained by reacting 1 mol of triallylcyanurate with 1 mol of a mixture of primary fatty amines (chain distribution $C_{12}$–$C_{20}$).

The insulation obtained with this mixture by extrusion at a material temperature of 125°C. to 130°C. (wall thickness of the insulation 2.2 mm on a copper conductor with a cross section of 1.5 mm$^2$) was then continuously cross-linked without pressure in a salt bath installed following the extruder, consisting of a eutectic nitrite-nitrate mixture at the following salt bath temperatures and dwelling times in the salt bath:

TABLE 2

| Salt Bath Temperature (°C.) | Dwelling Time in the Salt Bath / Cross-Linking Time (Sec.) | Percent Cross-Linking (%) |
|---|---|---|
| 210 | 18 | 87 |
| 230 | 10 | 87 |
| 250 | 7 | 89 |
| 260 | 4 | 86 |

After stepwise cooling (80°C., 60°C., 20°C. water temperature), insulation free of bubbles of cross-linked polyethylene with a high degree of cross-linking (Table 2) was obtained which, while adhering to the copper conductor, was easily stripped therefrom.

EXAMPLE 4

A carefully cleaned aluminum conductor composed of individual wires with a cross section of 1.5 mm$^2$ was preheated to 160°C. by means of a suitable wire preheating apparatus and was continuously sprayed all around with a mixture of 96.5 parts of high-pressure polyethylene ($d = 0.918$, $MFI_{190/2} = 0.2$), 1.2 parts of 1,3-bis(t-butylperoxyisopropyl)benzene (96%), 2.0 parts of N,N'-bis-(2,4-dialloxy-s-triazine-6)diaminooctane and 0.3 parts of polymer 2,2,4-trimethyl-1,2dihydroquinoline.

The mixture was prepared by reacting the granular polyethylene with a solution of the peroxide, the N,N'-bis-(2,4-dialloxy-s-triazine-6) diaminooctane and the aging retardant in dichloromethane; the mixture was allowed to stand for several days and the solvent was then evaporated. The mixture was homogenized through a mixing extruder at 120°C. and then granulated.

The insulation obtained by extruding at a material temperature of 127°C. to 132°C. with a wall thickness of the insulation of 0.8 mm was then continuously cross-linked without pressure by passing it through a salt bath installed following the extruder, which consisted of a eutectic nitrite-nitrate mixture, at the following salt bath temperatures and dwelling times in the salt bath:

TABLE 3

| Salt Bath Temperature (°C.) | Dwelling Time in the Salt Bath / Cross-Linking Time (Sec.) | Percent Cross-Linking (%) |
|---|---|---|
| 210 | 15 | 85 |
| 220 | 12 | 86 |
| 240 | 9 | 88 |
| 250 | 7 | 87 |

After cooling, insulation with the cross-linking data given in Table 3 was obtained, which had good adhesion to the aluminum conductor and was easily stripped therefrom.

EXAMPLE 5

A copper conductor pretreated as in Example 1 was sprayed all around with a mixture of 96.3 parts of high-pressure polyethylene ($d = 0.920$, $MFI_{190/2} = 0.2$), stabilized with 0.15% by weight of 4,4'-thio-bis-(3-methyl-6-t-butylphenol), 1.5 parts of dicumylperoxide (95%), 2.0 parts 2,4-dialloxy-6-stearylamino-s-triazine, 0.2 parts of polymer 2,2,4-trimethyl-1.2-dihydroquinoline. The polyethylene mixture was prepared in the manner described in Example 1.

The insulation obtained with this mixture by extruding at a material temperature of 128°C. – 132°C. (wall thickness of the insulation 0.8 mm) was then continuously cross-linked in a salt bath installed following extruder, consisting of a eutectic nitrite-nitrate mixture, at the following salt bath temperatures and dwelling times in the salt bath:

TABLE 4

| Salt Bath Temperature (°C.) | Dwelling Time in the Salt Bath / Cross-Linking Time (Sec.) | Percent Cross-Linking (%) |
|---|---|---|
| 190 | 52 | 81 |
| 200 | 28 | 83 |
| 220 | 11 | 84 |
| 240 | 6 | 82 |
| 250 | 4 | 80 |

After cooling in steps, insulation of cross-linked polyethylene free of bubbles, which adhered tightly to the conductor, was obtained with the cross-linking data given in Table 4.

EXAMPLE 5

A mixture was prepared as per the information in Example 1, which contained 1.6 parts of di-t-butylperoxide instead of 1.2 parts of 1,3-bis-(t-butylperoxyisopropyl)benzene.

The insulation obtained with this mixture by extruding at a material temperature of 130°C. to 135°C. (wall thickness of the insulation 0.8 mm) was then continuously cross-linked in a salt bath installed following the extruder, consisting of a eutectic nitrite-nitrate mixture at the following salt bath temperature and dwelling times in the salt bath:

TABLE 5

| Salt Bath Temperature (°C.) | Dwelling Time in the Salt Bath / Cross-Linking Time (Sec.) | Percent Cross-Linking (%) |
|---|---|---|
| 190 | 72 | 85 |
| 210 | 18 | 86 |
| 230 | 10 | 87 |
| 250 | 6 | 84 |

After cooling in steps, a bubble-free, easily stripped insulation with a high degree of cross-linking was obtained (Table 5).

EXAMPLE 7

As per Example 1, a mixture was prepared, which contained a high-pressure polyethylene ($d = 0.918$) with an MFI value 0.5 instead of a high-pressure polyethylene with the MFI value 0.2.

The insulation obtained with this mixture according to Example 1 was free of bubbles and highly cross-linked, as will be seen from Table 6.

TABLE 6

| Salt Bath Temperature (°C.) | Dwelling Time in the Salt Bath / Cross-Linking Time (Sec.) | Percent Cross-Linking (%) |
|---|---|---|
| 200 | 32 | 79 |
| 220 | 12 | 78 |
| 240 | 8 | 81 |
| 260 | 4 | 80 |

EXAMPLE 8

A carefully cleaned copper conductor according to Example 1 was heated to 160°C. by a suitable wire preheating apparatus and continuously sprayed all around with a mixture of 95.8 parts of high-pressure polyethylene ($d = 0.918$, $MFI_{190/2} = 0.2$), 1.4 parts of 1,3-bis(t-butylperoxyisopropyl)benzene (96%), 2.0 parts 2,4-dialloxy-6-dodecylamino-s-triazine, 0.3 parts of polymer 2,2,4-trimethyl-1.2-dihydroquinoline and 0.5 parts of a commercial metal deactivator. To prepare the mixture, the polyethylene in granular form was reacted with the metal deactivator and homogenized through a heated kneading machine at 180°C. under nitrogen. The mixture was comminuted and reacted with a solution of the peroxide, the 2,4-dialloxy-6-dodecylamino-s-triazine and the aging retardant in dichloromethane; the mixture was allowed to stand for several days and the solvent was then evaporated.

The insulation obtained with this mixture by extruding at a material temperature of 123°C. to 127°C. (wall thickness of the insulation of 0.8 mm) was then continuously cross-linked without pressure in a salt bath installed following the extruder, consisting of a nitrite-nitrate mixture, at the following salt bath temperatures and dwelling times in the salt bath:

TABLE 7

| Salt Bath Temperature (°C.) | Dwelling Time in the Salt Bath / Cross-Linking Time (Sec.) | Percent Cross-Linking (%) |
|---|---|---|
| 200 | 40 | 80 |
| 220 | 15 | 81 |
| 240 | 8 | 79 |
| 250 | 6 | 80 |

After cooling in steps (80°C., 60°C., 20°C. water temperature), bubble-free insulation with adequate cross-linking was obtained having good adhesion to the copper conductor and being easily stripped therefrom. (Table 7).

EXAMPLE 9

In a further series of tests pigment concentrates with the colors yellow, green, brown and blue, which in each case contained small amounts of titaniumdioxide, were added to the mixture according to Example 1 prior to extruding. The insulation obtained by extruding with subsequent continuous cross-linking without pressure (cross-linking temperatures and times according to Example 1) was free of bubbles and sufficiently cross-linked. It was furthermore found that the colors were not affected by the pressureless cross-linking in the salt bath at temperatures above 200°C.

EXAMPLE 10

The core of a medium-voltage cable was fabricated by preheating a copper conductor composed of individual wires with a cross-section of 25 mm$^2$ to about 120°C. and then covering it at the same time in a dual spraying head with the conductor finishing agent and the insulation. As the conductor finishing agent a copolymer of ethylene-vinyl acrylate or ethylene-vinyl acetate was used, to which was added carbon black, and as the cross-linking agent, 1 to 2% of dicumyl peroxide.

For the insulation, the mixture described in Example 1 was used. The procedure for the preparation of the mixture also was as described in Example 1.

The conductor finish was extruded at a material temperature of 110°C. and the insulation mixture at a material temperature of 130°C. The wall thickness of the insulation was 5.5 mm. The cross-linking took place in a salt bath at 230°C. for 50 sec. After cooling in steps (80°C., 60°C., 20°C. water temperature), bubble-free insulation of cross-linked polyethylene, which had good adhesion to the likewise cross-linked conductor finish, was obtained with a cross-linking percentage of 85%.

It will be understood that it is intended to cover all changes and modifications of the examples of the invention herein chosen for the purpose of illustration which do not constitute departures from the spirit and scope of the invention.

We claim:

1. In a method for the manufacture of formed elongated articles of cross-linked polyethylene in which the polyethylene is shaped in the non-cross-linked condition and is subsequently cross-linked by the application of heat in the presence of organic radical-forming agents, the improvement wherein 0.1 to 20% by weight of polyethylene of a cross-link promoting coagent selected from the group consisting of 2,4-dienoxy-6-amino-alkyl(ene)-s-triazines and N,N'-bis-(2,4-dienoxy-s-triazine-6)-diamines, is admixed with said polyethylene and is thereafter shaped and continuously cross-linked by application of heating at about atmospheric pressure and at a temperature above about 150°C. and below the decomposition temperature of the components of said mixture.

2. The method of claim 1 wherein said polyethylene is shaped by extrusion.

3. The method of claim 2 wherein the heating temperature for cross-linking is between about 200°C. and 280°C.

4. The method according to claim 2, wherein a solution of said radical-forming agents and the said cross-link promoting coagent are mixed with powdered or granular polyethylene before the polyethylene is shaped.

5. The method according to claim 2, wherein the polyethylene is in powder or granular form and is externally barrel-coated with a liquid lubricant in proportion of between about 0.05 to 1.0% by weight of said polyethylene.

6. The method of claim 5 wherein said lubricant is selected from the group consisting of silicone oil and polyglycol in an amount between about 0.2 and 0.5% by weight.

7. The method according to claim 4 wherein said polyethylene is dissolved in a solvent which is not volatile in the range of the processing temperature of the polyethylene and has no detrimental effect on the subsequent cross-linking process.

8. The method of claim 7 wherein said solvent is selected from the group consisting of diphenyl ether and chlorinated diphenyl.

9. The method according to claim 1 wherein said polyethylene mixture contains 0.1 to 5% by weight of said polymer, of said cross-link promoting coagent.

10. The method according to claim 2 wherein said polyethylene mixture contains 0.1 to 5 % by weight of said polymer, of said cross-link promoting coagent.

11. The method according to claim 3 wherein said polyethylene mixture contains 0.1 to 5 % by weight of said polymer, of said cross-link promoting coagent.

12. The method according to claim 4 wherein said polyethylene mixture contains 0.1 to 5 % by weight of said polymer, of said cross-link promoting coagent.

13. The method according to claim 5 wherein said polyethylene mixture contains 0.1 to 5 % by weight of said polymer, of said cross-link promoting coagent.

14. The method according to claim 6 wherein said polyethylene mixture contains 0.1 to 5% by weight of said polymer, of said cross-link promoting coagent.

15. The method according to claim 7 wherein said polyethylene mixture contains 0.1 to 5% by weight of said polymer, of said cross-link promoting coagent.

16. The method according to claim 8 wherein said polyethylene mixture contains 0.1 to 5% by weight of said polymer, of said cross-link promoting coagent.

17. The method according to claim 1 wherein the cross-link promoting coagent is a compound selected from the group consisting of 2,4-dialkeneoxy-6-alkyl(-ene)amino-s-triazines of the general formula

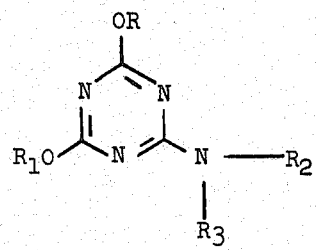

wherein:
R is any of an allyl, methallyl, ethallyl, propallyl, 3-ethyl-butenyl-2, 3 butenyl, 2,4-hexadienyl, crotyl, 3-nonenyl group;
$R_1$ is any of R;
$R_2$ is any of an alkyl group containing 1 to 20 carbon atoms, an alkylene cycloalkane group containing 4 to 10 carbon atoms, an alkylene aryl-heteroaryl) group with 7 to 10 carbon atoms, an allyl, alkene and alkyne group with 3 to 16 carbon atoms; and
$R_3$ is any of hydrogen, and an alkylene group.

18. The method of claim 17 wherein said alkylene of $R_3$ is cyclically bonded to said $R_2$.

19. The method of claim 17 wherein methylene groups of said alkylene of $R_3$ are substituted by radicals selected from the group consisting of oxy and thio groups.

20. The method of claim 2 wherein the coagent is the coagent of claim 17.

21. The method of claim 20 wherein the coagent is the coagent of claim 18.

22. The method of claim 20 wherein the coagent is the coagent of claim 19.

23. The method of claim 3 wherein the coagent is the coagent of claim 17.

24. The method of claim 23 wherein the coagent is the coagent of claim 18.

25. The method of claim 23 wherein the coagent is the coagent of claim 19.

26. The method of claim 4 wherein the coagent is the coagent of claim 17.

27. The method of claim 28 wherein the coagent is the coagent of claim 18.

28. The method of claim 26 wherein the coagent is the coagent of claim 19.

29. The method of claim 5 wherein the coagent is the coagent of claim 17.

30. The method of claim 29 wherein the coagent is the coagent of claim 18.

31. The method of claim 29 wherein the coagent is the coagent of claim 19.

32. The method of claim 8 wherein the coagent is the coagent of claim 17.

33. The method of claim 32 wherein the coagent is the coagent of claim 18.

34. The method of claim 32 wherein the coagent is the coagent of claim 19.

35. The method of claim 9 wherein the coagent is the coagent of claim 17.

36. The method of claim 35 wherein the coagent is the coagent of claim 18.

37. The method of claim 35 wherein the coagent is the coagent of claim 19.

38. The method of claim 1 wherein the cross-link promoting coagent is a compound selected from the group consisting of bridged unsaturated s-triazines of the general formula

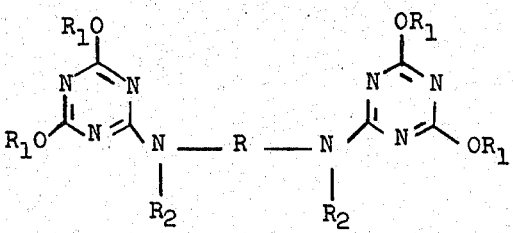

wherein:
R is any of an alkylene group with 2 to 18 carbon atoms, a bisalkylene cycloalkane group with 5 to 10 carbon atoms, and dialkyl furan, -thiophene, -pryidine or -triazine group with 6 to 12 carbon atoms and heterocyclic groups substituted with alkylene groups;

R₁ is any of allyl, crotyl, methallyl, ethallyl, propallyl, 3-butenyl, 2-hexenyl, 2,4-hexadienyl-3-decenyl and unsaturated groups; and, R₂ is selected from the group consisting of hydrogen and an alkylene group which together with R forms a diazacycloaliphatic ring.

39. The method of claim 2 wherein the coagent is the coagent of claim 38.

40. The method of claim 3 wherein the coagent is the coagent of claim 38.

41. The method of claim 4 wherein the coagent is the coagent of claim 38.

42. The method of claim 5 wherein the coagent is the coagent of claim 38.

43. The method of claim 8 wherein the coagent is the coagent of claim 38.

44. The method of claim 9 wherein the coagent is the coagent of claim 38.

45. The method of claim 12 wherein the coagent is the coagent of claim 38.

46. The method of claim 16 wherein the coagent is the coagent of claim 38.

47. The method of claim 17 wherein said cross-link promoting coagent is selected from the group consisting of:

a. 2,4-dialloxy-6-methylamino-s-triazine;
b. 2,4-diethalloxy-6-stearylamino-s-triazine;
c. 2,4-dimethalloxy-6-allylamino-s-triazine;
d. 2,4-dialloxy-6-phenethylamino-s-triazine;
e. 2,4-dialloxy-6-pyrrolidino-s-triazine;
f. 2,4-dimethalloxy-6-pyrrolino-s-triazine;
g. 2,4-dialloxy-6-morpholino-s-triazine;
h. 2,4-dicrotyloxy-6-benzylamino-s-triazine; and
i. 2,4-dialloxy-6-dodecylamino-s-triazine.

48. The method of claim 38 wherein said cross-link promoting coagent is selected from the group consisting of:

a. N,N'-bis-(2,4-dialloxy-s-triazine-6-)-diamino ethane;
b. N,N'-bis-(2,4-dialloxy-s-triazine-6-)-diamino butane;
c. N,N'-bis-(2,4-dimethalloxy-s-triazine-6)diamino hexane;
d. N,N'-bis-(2,4-diethalloxy-s-triazine-6)diamino octane;
e. N,N'-bis-(2,4-dialloxy-s-triazine-6)-diaminodiethylene-2,4-s-triazine;
f. N,N'-bis-(2,4-dialloxy-s-triazine-6)-diaminodiethylene pyridine; and,
g. N,N'-bis-(2,4-dialloxy-s-triazine-6)-piperazine.

* * * * *

UNITED STATES PATENT AND TRADEMARK OFFICE
CERTIFICATE OF CORRECTION

PATENT NO. : 3 936 523
DATED : February 3, 1976
INVENTOR(S) : Wolfgang Kleeberg et al It is certified that error appears in the above-identified patent and that said Letters Patent are hereby corrected as shown below:

In column 6, line 58, change "di1tertiary" to --di-tertiary--.

In column 8, line 5, change "$1.5mm^2 2$" to --$1.5mm^2$--.

In column 10, line 29, after the word "following" add the word --the--.

In column 14, line 24, change "27. The method of claim 28" to --27. The method of claim 26--.

Signed and Sealed this

Thirteenth Day of July 1976

[SEAL]

Attest:

RUTH C. MASON
*Attesting Officer*

C. MARSHALL DANN
*Commissioner of Patents and Trademarks*